US007252618B2

(12) United States Patent
Spakowski et al.

(10) Patent No.: US 7,252,618 B2
(45) Date of Patent: Aug. 7, 2007

(54) RACK AND PINION TRANSMISSION FOR A PINTLE VALVE

(75) Inventors: Joseph G. Spakowski, Rochester, NY (US); Robert B. Perry, Leicester, NY (US); John G. Habets, Rochester, NY (US); Callisto Genco, Charlotte (LU); Richard R. Kuhr, Lombard, IL (US); Muquarram Colabawala, Marietta, GA (US); Eddy Sugyarto, Marietta, GA (US)

(73) Assignee: Delphi Technologies, Inc., Troy, MI (US)

( * ) Notice: Subject to any disclaimer, the term of this patent is extended or adjusted under 35 U.S.C. 154(b) by 345 days.

(21) Appl. No.: 10/965,383

(22) Filed: Oct. 14, 2004

(65) Prior Publication Data

US 2006/0081077 A1 Apr. 20, 2006

(51) Int. Cl.
*F16H 57/08* (2006.01)
*F16H 27/02* (2006.01)
*F16H 1/04* (2006.01)
*H02K 7/116* (2006.01)

(52) U.S. Cl. ...................... 475/343; 74/89.17; 74/422; 74/421 A

(58) Field of Classification Search ................ 475/343, 475/331, 344; 74/89.17, 353, 354, 384, 416, 74/422, 421 R, 421 A, 437, 438; 123/568.18, 123/568.23, 568.24, 568.26; 251/129.11
See application file for complete search history.

(56) References Cited

U.S. PATENT DOCUMENTS 4,363,193 A * 12/1982 Herzig ...................... 451/140
4,690,119 A * 9/1987 Makino et al. ........ 123/568.23
5,167,164 A * 12/1992 Maekawa et al. .......... 74/89.17
5,937,835 A 8/1999 Turner et al.
6,102,016 A * 8/2000 Sitar et al. ............. 123/568.23
6,142,711 A * 11/2000 Goughnour .................... 74/61
6,216,677 B1 * 4/2001 McConnell et al. ... 123/568.24
6,257,303 B1 * 7/2001 Coubray et al. ........... 74/89.18
7,017,884 B2 * 3/2006 Brinks et al. .......... 251/129.11

FOREIGN PATENT DOCUMENTS

EP 1 028 249 B1 7/2004

* cited by examiner

*Primary Examiner*—Roger Pang
(74) *Attorney, Agent, or Firm*—Paul L. Marshall

(57) ABSTRACT

A rack and pinion gear train actuator for a pintle valve. A motor shaft has a pinion gear that engages a large reduction gear having an integral hub gear. The hub gear is a planet gear for a ring gear segment that pivots on a shaft and includes a pinion gear segment that engages a linear rack. The rack is attached to a valve pintle shaft, causing the valve to be opened and closed in response to rotation of the motor shaft. The pintle shaft, return spring, rack, and gears are all assemblable by slip fit. The actuator has a high actuation force, a fast response time, and compact design by virtue of a rack and internal gearing. The stroke of the rack may be changed for use with pintle valves having differing strokes by varying the angle through which the motor operates.

11 Claims, 6 Drawing Sheets

RACK AND PINION TRANSMISSION FOR A PINTLE VALVE

TECHNICAL FIELD

The present invention relates to actuation of pintle-type valves; more particularly, to devices for positively actuating pintle valves in both the opening and the closing directions; and most particularly, to a pintle valve actuated by an electric motor and a rack and pinion gear transmission.

BACKGROUND OF THE INVENTION

Pintle or poppet valves are well known. For example, it is known to provide a pintle valve between the exhaust manifold and the intake manifold of an internal combustion engine for recirculating a portion of the engine exhaust into the intake air stream. Such a valve is known in the art as an exhaust gas recirculation (EGR) valve.

An EGR valve consists of two basic components, a valve assembly and an actuator. Typically, an actuator includes a position feedback sensor to monitor the degree of openness of the valve. Typical known actuators include linear solenoids, torque motors, stepper motors, and DC motors. The actuator, when coupled with an appropriate logic driver, moves the pintle shaft of the valve assembly to a desired position as commanded by a master engine control module (ECM). The position sensor provides feedback to the ECM on pintle shaft position so that the ECM can adjust the command to the actuator accordingly. When the engine is running, this closed loop control system operates continuously to regulate the correct amount of exhaust gas recirculation under all engine conditions.

Not all EGR valve performance is equal. Some important performance criteria for an EGR valve actuator are high force capability, to overcome carbon deposits on the pintle shaft; fast response to meet frequency-response modulated timing; low manufacturing cost, with few components and easy assembly; and adjustable actuation stroke, to allow an actuator to be used in a plurality of valve applications or sizes.

Solenoid actuators are low in cost but are also very low in force and generally may be driven in one direction only, relying on a spring for the opposite motion, which spring must be overcome by the solenoid, further reducing the available valve-opening force. Torque motors, although operable in both directions, are also force-limited, stroke-limited, and expensive. Stepper motors are response-time limited and force-limited.

DC motors that can meet the cost and size requirements for an EGR application do not have sufficient torque to generate the required amount of force directly and so typically are coupled to a transmission to gain mechanical advantage. With a proper prior art transmission, a DC motor actuator has the most force potential for an EGR valve but generally has the slowest response time of all prior art actuators.

What is needed is a DC motor as a valve actuator coupled with a gear transmission which overcomes many of the performance limitations of prior art actuators.

It is a principal object of the present invention to provide a high force potential for an EGR valve actuator at fast response time with low design, manufacturing, and assembly costs, having an easily adjustable actuation stroke, and being easily adaptable for combination with any of a plurality of pintle valve assemblies.

SUMMARY OF THE INVENTION

Briefly described, a rack and pinion transmission for a pintle valve in accordance with the invention includes a motor mounted to a body including a gear case. The motor shaft has a pinion gear that engages a large reduction gear having a hub gear. The hub gear is a planet gear for a planetary ring segment gear that pivots on a shaft and includes a pinion segment gear that engages a linear rack. The rack is attached to a valve pintle shaft, causing the valve to be opened and closed in response to rotation of the motor shaft. An actuator in accordance with the invention has low assembly costs, as the pintle shaft, a return spring, rack, and gears may all be assembled by slip fit. The gear case cover may be secured by machine.

An actuator in accordance with the invention is a high-force actuator having a fast time response and compact design by virtue of a rack and composite pinion and planetary gearing. Various types of rack position sensors may be adapted for use without requiring changes in the actuator. The stroke of the rack is readily adapted for use with various pintle valves having differing stroke requirements by simply varying the rotational angle through which the motor operates, or by changing the angular orientation of a composite gear during assembly.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
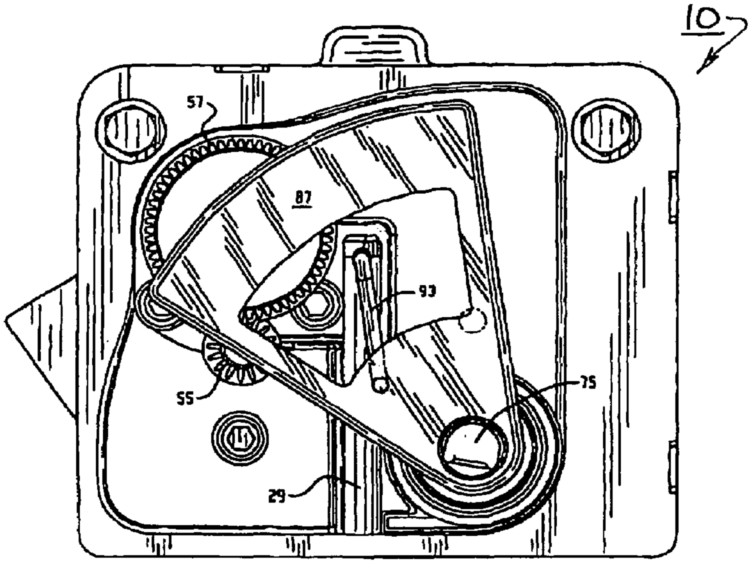
FIG. 1 (PRIOR ART)
FIG. 1 is an elevational view of a first embodiment of a prior art pintle valve actuator employing a rack and pinion transmission substantially as disclosed in European Patent No. EP 1 028 249 B1.

Referring to FIG. 1, in a first prior art gear transmission actuator 10 shown from European Patent No. EP 1 028 249 B1, motor gear 55 drives a first gear 57. A smaller hub gear (not visible) integral with gear 57 meshes with an internal gear (not visible) of sector gear 87. The hub gear defines a planet gear for which sector gear 87 is a planetary ring gear. Sector gear 87 pivots on fixed pin 75 and as sector gear 87 rotates it drives pintle shaft 29 linearly through link 93.

A first drawback of prior art actuator 10 is that link 93 places a side load on shaft 29 during actuation thereof, which can cause undesirable wear and premature failure. A second drawback is that the motion of shaft 29 is not linear with uniform rotation of gear 87.

Figure 2:
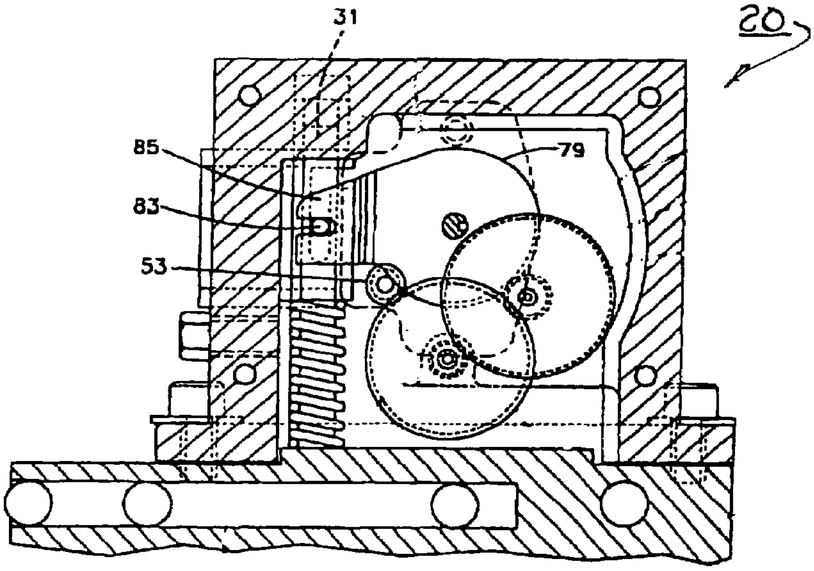
FIG. 2 (PRIOR ART)
FIG. 2 is an elevational view of a second embodiment of a prior art pintle valve actuator employing a rack and pinion transmission substantially as disclosed in U.S. Pat. No. 5,937,835.
Figure 3:
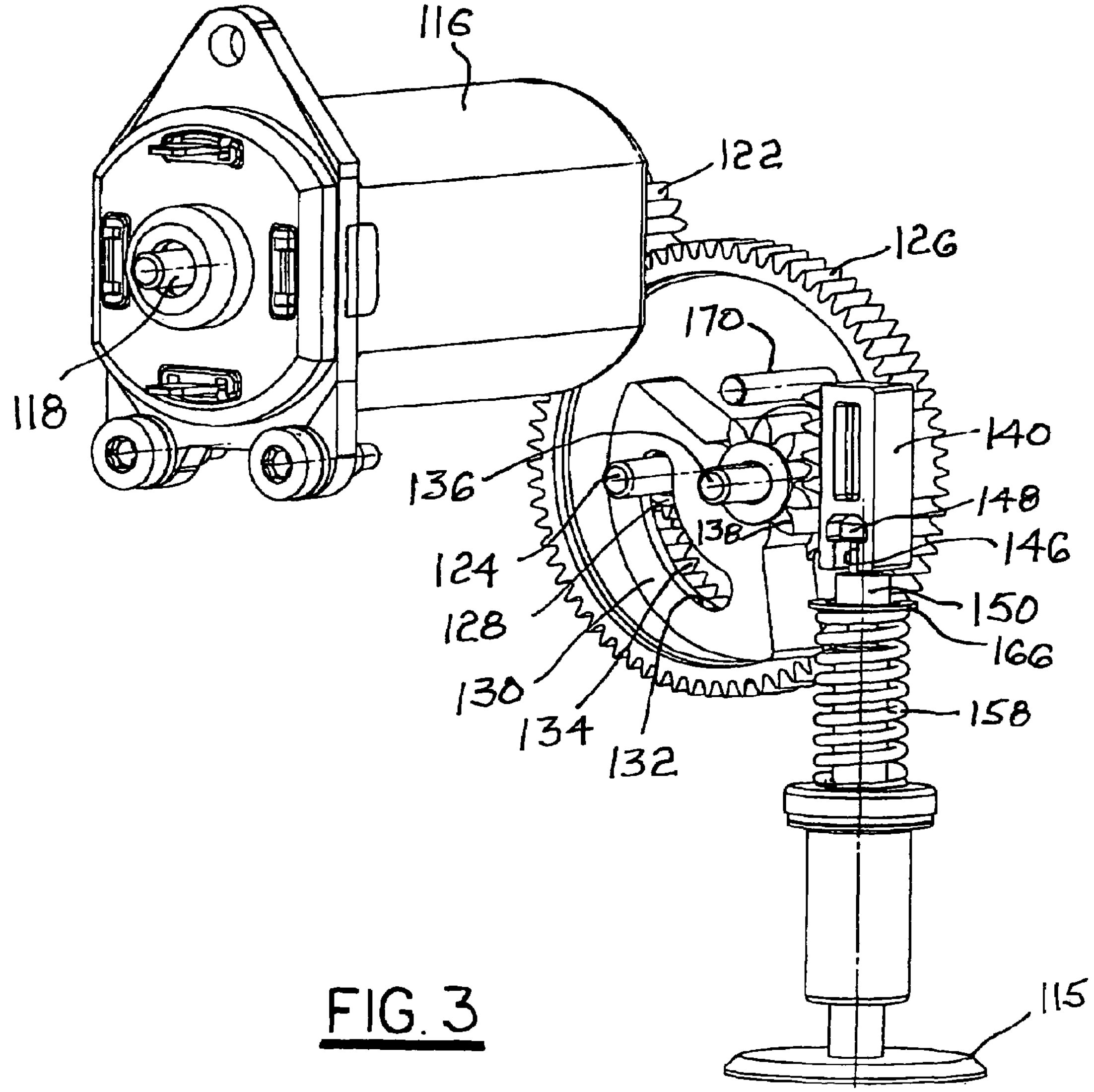
FIG. 3 is a first isometric view of a rack and pinion transmission in accordance with the invention for actuation of a valve pintle, showing just the motor, gear train, and valve pintle shaft.
Figure 4:
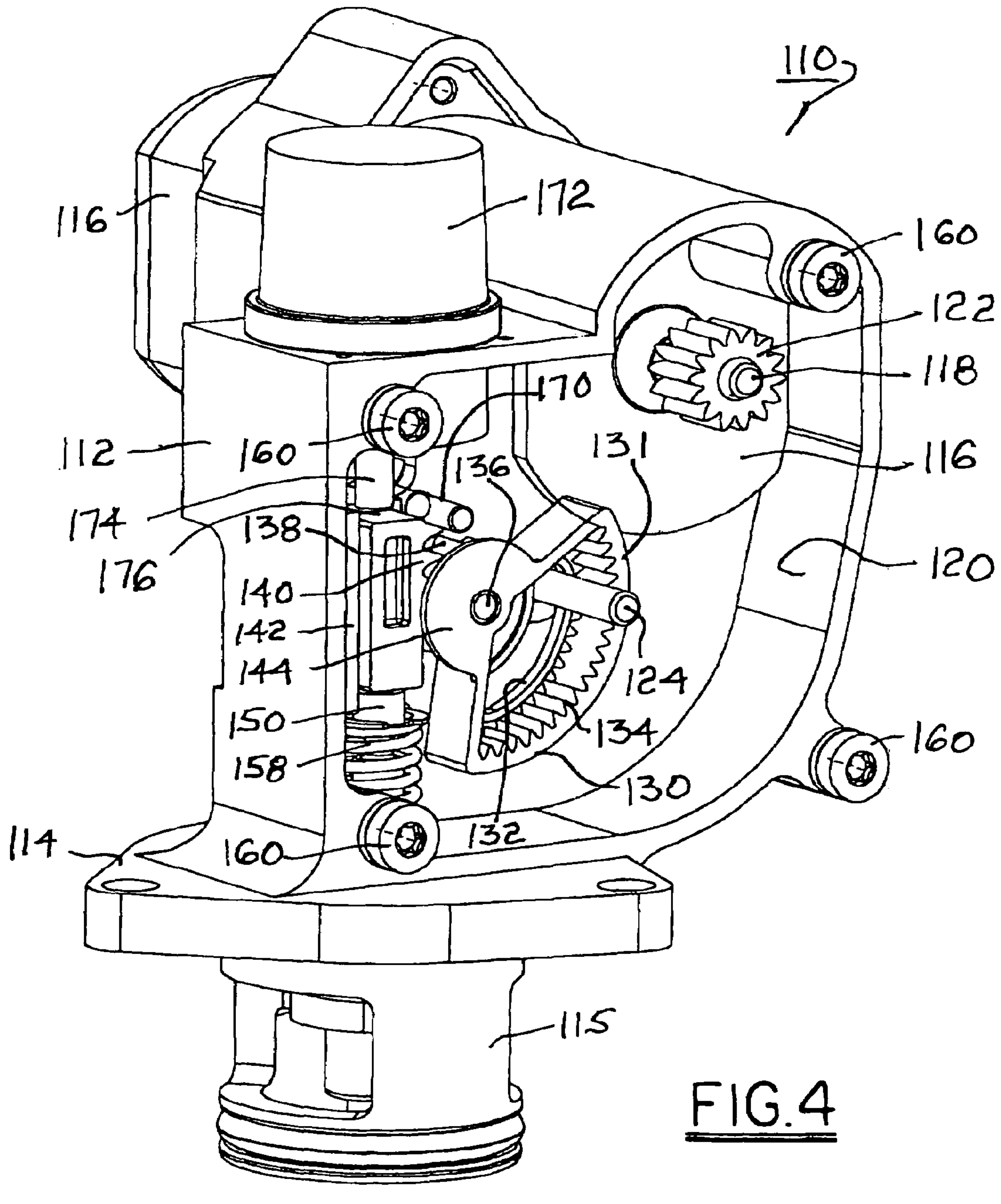
FIG. 4 is an isometric view of a transmission in accordance with the invention, showing a portion of the gear train shown in FIG. 3 disposed in a gear case.
Figure 5:
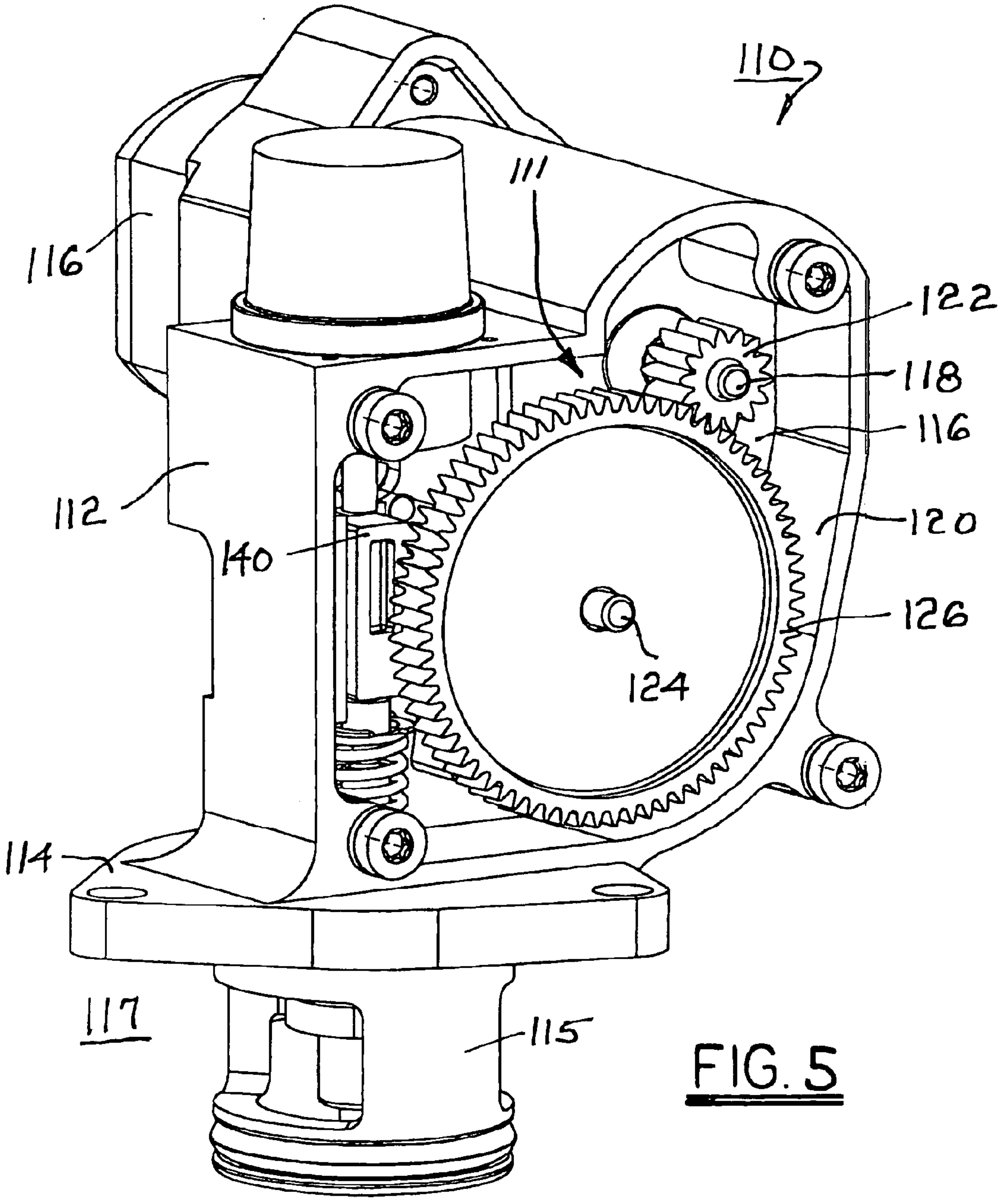
FIG. 5 is second isometric view of the transmission shown in FIG. 4, showing the entire gear train in a gear case.
Figure 6:
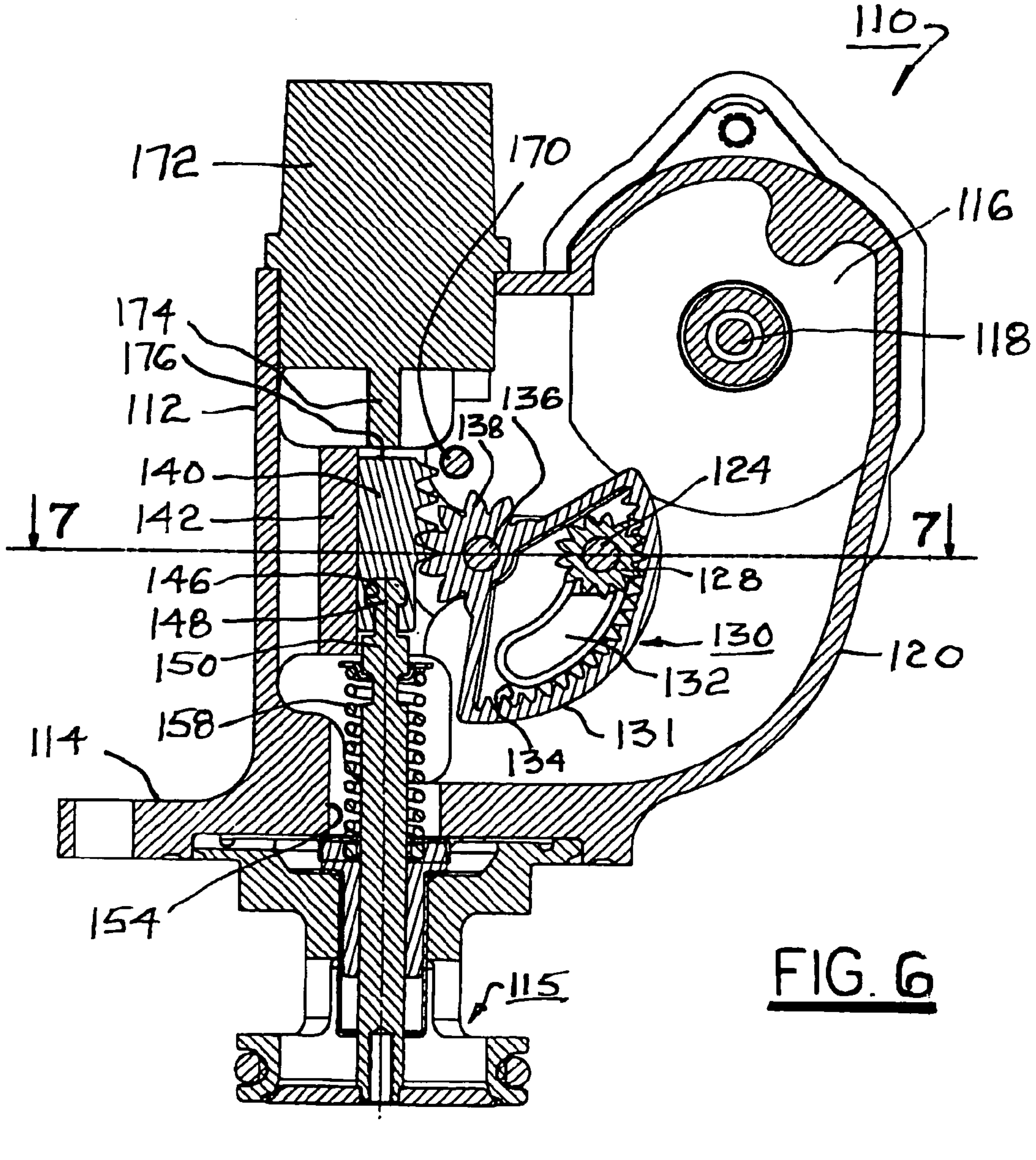
FIG. 6 is an elevational cross-sectional view of the transmission shown in FIGS. 4 and 5.
Figure 7:
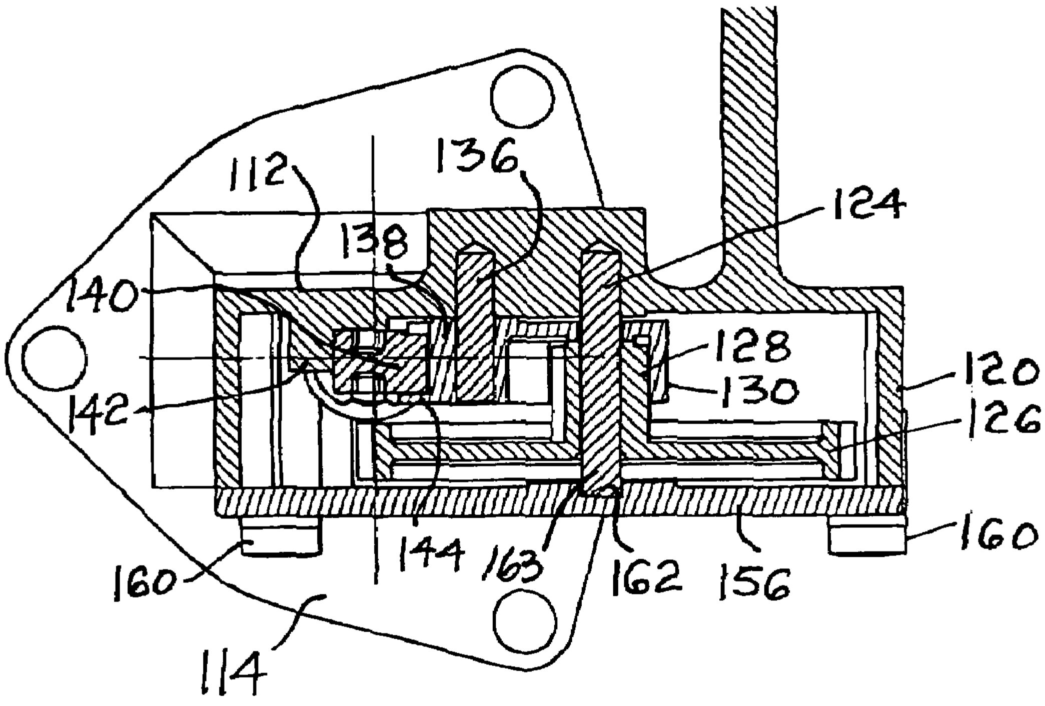
FIG. 7 is a cross-sectional view taken along line 7-7 in FIG. 6.

Referring to FIG. 2, in a second prior art gear transmission actuator 20 shown from U.S. Pat. No. 5,937,835, motor gear 53 drives three gear sets to achieve the desired torque. Third gear 79 has a forked arm that engages pin 83 attached to the pintle shaft. Drawbacks of prior art actuator 20 are the same as those of prior art actuator 10.

Referring to FIGS. 3 through 7, in an exemplary improved gear transmission actuator 110 containing gear train 111, in accordance with the invention, an actuator body 112 is provided for mounting of various actuator components. Body 112 includes means 114, for example, a mounting flange as shown, for attaching actuator 110 and associated valve 115 to an application, for example, an internal combustion engine 117 in known fashion. A drive motor 116, preferably a DC motor, is attached to body 112 and includes a motor shaft 118 extending into gear case 120. A first pinion gear 122 is mounted on shaft 118. A first fixed shaft 124 is mounted in body 112 and also extends into gear case 120. A first stage reduction gear 126 is mounted for rotation on shaft 124 and is driven by pinion gear 122. First stage gear 126 includes an integral hub gear 128 that inserts into a second stage gear 130 which is disposed via an arcuate slot 132 in gear 130 onto shaft 124 between body 112 and gear 126. Second stage gear 130 is a composite gear in that it includes a pie-shaped gear segment 131 having internal teeth 134 and a pinion gear segment 138. Internal teeth 134 on gear segment 131 mesh with teeth on integral hub gear 128, defining segment 131 as a planetary ring gear and hub gear 128 as a planet gear. Second stage gear 130 is pivotably mounted on a second fixed shaft 136 and includes a pinion gear segment 138 having teeth for mating with the teeth of a linear rack 140. Thus, rotary motion of motor shaft 118 is converted to linear motion of rack 140. Note that the linear motion of rack 140 is uniformly proportional to the rotary motion of motor shaft 118.

Rack 140 is located within body 112 by a rack keeper 142 which is a feature of body 112. Rack 140 is also kept in position by a rack retainer 144 which is a flange on the side of pinion gear segment 138. Rack 140 is provided with a bulbous opening 146 for receiving a bulb end 148 on a shaft 150 for actuation thereof. For example, shaft 150 may be the pintle shaft of poppet valve 115, such as an EGR valve for an internal combustion engine 117. In the example shown, shaft 150 extends into gear case 120 via an opening 154. A bias return spring 158 urges valve 115 into a closed position and eliminates mechanical lash in the entire gear train.

Gear case 120 includes a cover plate 156 that is attached to housing 112 via bolts 160. Cover plate 156 includes an inner bore 162 for receiving and stabilizing the outer end 163 of first shaft 124.

Preferably, a stop pin 170 is provided within gear case 120 and extending inward from body 112. Pin 170 is positioned to interfere with travel of pie-shaped gear segment 131 and thus function as a lower limit of rack travel.

Preferably, an actuator 110 in accordance with the invention includes a position sensor 172 for determining the position of rack 140, and hence the open status of valve 115, at all times. The rack position is monitored by the engine control module (not shown) by receiving feedback from position sensor 172 mounted on body 112.

Preferably, sensor 172 includes an axially slidable probe 174, the position of which is sensed in known fashion within sensor 172. Probe 174 engages an upper surface 176 of rack 140.

In opening operation, when a positive voltage command is applied to motor 116, motor 116 turns gear 122 in a clockwise (CW) direction. Gear 122 then drives gear 126 and associated gear 128 in a counter-clockwise (CCW) direction. Gear 128 drives gear 131 in a CCW direction which also drives gear 138 in a CCW direction, causing rack 140 to be displaced downward (with respect to the orientation shown in FIGS. 3 through 6). Rack 140 causes pintle shaft 150 to be displaced downward, causing valve 115 to be opened. Degree of opening is limited by stop pin 170 as described above.

Closing operation is the reverse of opening.

In fail-safe closing, should motor 116 lose power, return spring 158, attached to shaft 150 by collar 166, will urge valve 115 into a closed position.

An actuator 110 in accordance with the invention entails desirably easy assembly and low assembly costs. Motor 116 may be assembled to body 112 by machine, and gear 122 is readily installed conventionally onto motor shaft 118. Fixed shafts 124,136 and stop pin 170 may be inserted into bores in body 112 by machine. No extraneous parts, such as screws or clips, are required to complete the assembly, nor is any welding. The pintle shaft, spring, rack, and gears are all assembled by slip fit. The gear case cover may be secured by machine.

An actuator 110 in accordance with the invention is a high-force actuator having a fast time response and compact design by virtue of a rack 140 and internal gearing between gears 128,130. Various types of sensors 172 may be adapted for use without requiring changes in the actuator. The stroke of the rack is readily adapted for use with various pintle valves having differing stroke requirements either by varying the rotational angle through which the motor operates or by varying the angle at which composite gear 131 is installed onto shaft 136.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An actuator for displacing a shaft, comprising:

a) a rack for engaging said shaft;

b) a composite gear having a pinion gear segment for engaging said rack and having a planetary ring gear segment;

c) a reduction gear including a planet gear as an integral hub gear, said planet gear for engaging said planetary ring gear segment to drive said composite gear; and d) an electric motor for driving said planet gear, said electric motor having a shaft and a pinion gear disposed on said shaft, said reduction gear engaging said pinion gear of said electric motor.

2. An actuator in accordance with claim 1 wherein said motor is a DC motor.

3. An actuator in accordance with claim 1 further comprising an actuator body including a gear case, wherein said reduction gear and said integral hub gear are rotatably disposed on a first shaft, and wherein said composite gear is rotatably disposed on a second shaft.

4. An actuator in accordance with claim 3 further comprising a cover for said gear case, wherein said cover includes a bore for supporting an end of said first shaft.

5. An actuator in accordance with claim 3 wherein said motor is mounted on said actuator body, said motor shaft extending into said gear case.

6. A gear train for converting rotational motion of a first shaft into linear motion of a second shaft, comprising:

a) a rack for engaging said second shaft;

b) a composite gear having a pinion gear segment for engaging said rack and having a planetary ring gear segment;

c) a reduction gear including a planet gear as an integral hub gear, said planet gear for engaging said planetary ring gear segment to drive said composite gear; and d) an electric motor for driving said planet gear, said electric motor including a motor shaft and a pinion gear mounted on said motor shaft, said reduction gear engaging said pinion gear of said electric motor.

7. A pintle valve having a pintle shaft and having a gear transmission for actuating the pintle shaft to open and close the valve, comprising:

a) a rack for engaging said pintle shaft;

b) a composite gear having a pinion gear segment for engaging said rack and having a planetary ring gear segment; and c) a reduction gear including a planet gear as an integral hub gear, said planet gear for engaging said planetary ring gear segment to drive said composite gear; and d) an electric motor for driving said planet gear, said electric motor including a motor shaft and a pinion gear mounted on said motor shaft, said reduction gear engaging said pinion gear of said electric motor.

8. A pintle valve in accordance with claim 7 wherein said pintle valve is an exhaust gas recirculation valve for an internal combustion engine.

9. An internal combustion engine comprising an exhaust gas recirculation valve, wherein said valve is a pintle valve having a pintle shaft and a gear transmission actuator, and wherein said actuator includes a rack for engaging said pintle shaft, a composite gear having a pinion gear segment for engaging said rack and having a planetary ring gear segment, a reduction gear including a planet gear as an integral hub gear, said planet gear for engaging said planetary ring gear segment to drive said composite gear; and an electric motor for driving said planet gear, said electric motor including a motor shaft and a pinion gear mounted on said motor shaft, said reduction gear engaging said pinion gear of said electric motor.

10. An actuator for displacing a shaft, comprising:

a) a rack for engaging said shaft;

b) a composite gear having a pinion gear segment for engaging said rack and having a planetary ring gear segment;

c) a planet gear for engaging said planetary ring gear segment to drive said composite gear; and d) a driver for driving said planet gear, wherein said planet gear being rotatably disposed on a first shaft, wherein said composite gear being rotatably disposed on a second shaft, and wherein said first shaft is fixedly positioned relative to said second shaft.

11. An actuator in accordance with claim 10, wherein said driver is an electric motor.

* * * * *